(12) United States Patent
Hsiao et al.

(10) Patent No.: US 10,818,418 B2
(45) Date of Patent: Oct. 27, 2020

(54) METHOD FOR MANUFACTURING SHUNT RESISTOR

(71) Applicant: YAGEO CORPORATION, Kaohsiung (TW)

(72) Inventors: Shen-Li Hsiao, Kaohsiung (TW); Kuang-Cheng Lin, Kaohsiung (TW); Hwan-Wen Lee, Kaohsiung (TW); Chih-Lung Chen, Kaohsiung (TW)

(73) Assignee: YAGEO CORPORATION, Kaohsiung (TW)

( * ) Notice: Subject to any disclaimer, the term of this patent is extended or adjusted under 35 U.S.C. 154(b) by 275 days.

(21) Appl. No.: 15/963,116

(22) Filed: Apr. 26, 2018

(65) Prior Publication Data
US 2019/0295748 A1 Sep. 26, 2019

(30) Foreign Application Priority Data
Mar. 26, 2018 (CN) .......................... 2018 1 0251026

(51) Int. Cl.
| B23K 11/00 | (2006.01) |
| H01C 1/144 | (2006.01) |
| B23K 3/03 | (2006.01) |
| H01C 17/28 | (2006.01) |

(52) U.S. Cl.
CPC .......... *H01C 1/144* (2013.01); *B23K 3/0307* (2013.01); *B23K 11/0066* (2013.01); *H01C 17/28* (2013.01)

(58) Field of Classification Search
CPC ........ H01C 1/144; H01C 17/28; H01C 1/148; H01C 13/00; H01C 17/281; B23K 11/002; B21J 15/00; B21J 15/08
See application file for complete search history.

(56) References Cited

U.S. PATENT DOCUMENTS

| 4,037,073 A | * | 7/1977 | Becker | ................. B23K 11/163 219/92 |
| 5,382,938 A | * | 1/1995 | Hansson | ............... H01C 1/1406 338/114 |
| 6,304,062 B1 | * | 10/2001 | Batson | .................. G01R 1/203 320/134 |

(Continued)

FOREIGN PATENT DOCUMENTS

| CN | 1545106 A | 11/2004 |
| CN | 101097232 A | 1/2008 |

(Continued)

*Primary Examiner* — Brian W Jennison
(74) *Attorney, Agent, or Firm* — CKC & Partners Co., LLC (57) ABSTRACT

A method for manufacturing a shunt resistor is described. In this method, a first electrode plate and a second electrode plate are provided. The first electrode plate includes a first carrying portion having a first hole. The second electrode plate includes a second carrying portion having a second hole. A resistor plate is placed between the first and second electrode plates. The resistor plate has a first through hole and a second through hole respectively on the first hole and the second hole. A first rivet is pressed into the first through hole and the first hole. A second rivet is pressed into the second through hole and the second hole. Current is applied to the first rivet and the second rivet to weld the first rivet, the first electrode plate and the resistor plate, and to weld the second rivet, the second electrode plate and the resistor plate.

10 Claims, 5 Drawing Sheets

(56) References Cited

U.S. PATENT DOCUMENTS

| | | | |
|---|---|---|---|
| 10,438,730 B2* | 10/2019 | Kao | H01C 1/14 |
| 2006/0193051 A1* | 8/2006 | Anthony | H02K 11/024 |
| | | | 359/559 |
| 2012/0154104 A1* | 6/2012 | Hetzler | G01R 1/203 |
| | | | 338/49 |
| 2012/0229247 A1* | 9/2012 | Yoshioka | G01R 1/203 |
| | | | 338/49 |
| 2014/0097933 A1 | 4/2014 | Yoshioka et al. | |
| 2015/0212115 A1* | 7/2015 | Nakamura | G01R 1/203 |
| | | | 338/332 |
| 2017/0125142 A1* | 5/2017 | Nakamura | H01C 1/148 |

FOREIGN PATENT DOCUMENTS

| | | |
|---|---|---|
| CN | 100481277 C | 4/2009 |
| CN | 101483091 B | 7/2012 |
| CN | 102640233 B | 9/2015 |
| CN | 205810498 U | 12/2016 |
| CN | 206639664 U | 11/2017 |
| TW | 201523653 A | 6/2015 |
| WO | 2017110354 A1 | 6/2017 |

* cited by examiner

METHOD FOR MANUFACTURING SHUNT RESISTOR

RELATED APPLICATIONS

This application claims priority to China Application Serial Number 201810251026.1, filed Mar. 26, 2018, which is herein incorporated by reference.

BACKGROUND

Field of Invention

The present invention relates to a resistor. More particularly, the present invention relates to a method for manufacturing a shunt resistor having a modular structure.

Description of Related Art

In manufacturing a shunt resistor, an E-beam welding technique, a seam welding technique or a laser beam welding technique is typically used to combine a highly electrically-conductive electrode material with a resistance alloy material to form a resistance composite material. Then, the resistance composite material is divided and punched to form a preliminary model for plural shunt resistors. Next, resistance of the preliminary model of the shunt resistor is trimmed and adjusted by using a resistance trimming apparatus, so as to achieve an accuracy of the resistance of the shunt resistor.

However, an E-beam welding operation has to be performed in vacuum for the whole process, thus increasing welding cost. In addition, during the E-beam welding operation, materials are likely to be spattered, thus not only affecting a main body of the resistance alloy material that results in a bad control on the resistance of the shunt resistor, but also forming holes and/or spattered protrusions on a surface of the shunt resistor that results in a poor appearance of the shunt resistor. Furthermore, if the depth of the E-beam is not appropriately adjusted during welding, obvious weld beads are formed, and the resistance of the shunt resistor is also hard to be controlled. Moreover, when punching is performed, the stress in the resistance composite material is changed, thus causing the resistance of the shunt resistor to be changed. Accordingly, it needs a lot time to trim the resistance of the shunt resistor that is formed by using the E-beam welding technique. A remnant of the resistance composite material after being punched is a composite material of the electrode material and the resistance alloy material, and thus is difficult to be recycled.

When being aligned and emitted toward top and bottom sides of the resistance composite material for welding the resistance composite material, the laser beams are often too large or too small, thus resulting in weld beads with poor appearance, and poor control of the resistance of the shunt resistor. In addition, the laser beam welding technique also has disadvantages including of difficultly recycling remnants of the material and requiring a lot time of trimming the resistance.

SUMMARY

One objective of the present invention is to provide a method for manufacturing a shunt resistor, in which a highly electrically-conductive electrode material and a resistance alloy material are respectively used to form the first electrode plate and the second electrode plate, and the resistor plate, and then rivets are used to combine the first electrode and the second electrode plate with the resistor plate located on the first electrode and the second electrode. Thus, utilization of the electrode material and the resistance material is increased, remnants of the electrode material and the resistance material are easy to be recycled, and the shunt resistors may be in various shapes according to the practical requirements.

Another objective of the present invention is to provide a method for manufacturing a shunt resistor, in which a first rivet and a second rivet are used to pre-position the resistor plate on the first electrode plate and the second electrode plate, and pressure and current are directly applied to the first rivet and the second rivet, such that the current is mainly centered on the first rivet and the second rivet. Thus, heat generated by applying current is also centered on the first rivet and the second rivet, such that an outer edge of the first rivet, the first electrode plate, and the resistor plate are welded, and an outer edge of the second rivet, the second electrode plate, and the resistor plate are welded. Accordingly, with the application of the method, productivity is effectively enhanced, and energy consumption of welding the resistor module is greatly decreased, thereby reducing production cost of the shunt resistor. Furthermore, a combination method that uses the rivets to weld the electrode plates and the resistor plate can strengthen the structure of the shunt resistor, thereby enhancing stability of the shunt resistor.

Still another objective of the present invention is to provide a method for manufacturing a shunt resistor, in which the resistance of the resistor plate can be firstly and accurately calculated in forming the resistor plate, such that the accuracy of the resistance of the shunt resistor is enhanced, and time for trimming the resistance of the shunt resistor is greatly reduced, thereby effectively increasing productivity.

Yet another objective of the present invention is to provide a method for manufacturing a shunt resistor, in which various resistor modules are arranged on a conveyer in sequence, the resistor modules are pressed in sequence as the conveying of the conveyer by simultaneously pressing two sides of each of the resistor modules, and pressure and current are directly applied to the rivets by using conductive modules. Thus, the shunt resistors can be continuously manufactured, thereby effectively enhancing production efficiency.

According to the aforementioned objectives, the present invention provides a method for manufacturing a shunt resistor. In this method, a first electrode plate and a second electrode plate are provided, in which the first electrode plate includes a first carrying portion, the second electrode plate includes a second carrying portion, the first carrying portion has at least one first hole, and the second carrying portion at least one second hole. A resistor plate is placed between the first electrode plate and the second electrode plate on the first carrying portion and the second carrying portion, in which the resistor plate has at least one first through hole and at least one second through hole, the first through hole is correspondingly located on the first hole, and the second through hole is correspondingly located on the second hole. At least one first rivet is pressed and placed into the first through hole and the first hole, and at least one second rivet is pressed and placed into the second through hole and the second hole. A current is applied to the first rivet and the second rivet to weld the first rivet, the first electrode plate, and the resistor plate, and to weld the second rivet, the second electrode plate, and the resistor plate.

According to the aforementioned objectives, the present invention further provides a method for manufacturing a shunt resistor. In this method, various resistor modules are placed on a conveyer. Each of the resistor modules includes a first electrode plate, a second electrode plate, and a resistor plate. The first electrode plate includes a first carrying portion, and the first carrying portion has at least one first hole. The second electrode plate includes a second carrying portion, and the second carrying portion has at least one second hole. The resistor plate is disposed between the first electrode plate and the second electrode plate and is located on the first carrying portion and the second carrying portion, in which the resistor plate has a first side surface and a second side surface opposite to the first side surface, the resistor plate has at least one first through hole and at least one second through hole, the first through hole is correspondingly located on the first hole, and the second through hole is correspondingly located on the second hole. The first electrode plate and the second electrode plate of each of the resistor modules are pressed onto the first side surface and the second side surface of the resistor plate respectively. At least one first rivet and at least one second rivet are pressed and placed into the first through hole and the first hole, and the second through hole and the second hole of each of the resistor modules respectively. A current is applied to the first rivets and the second rivets in the resistor modules in sequence to weld the first rivet, the first electrode plate, and the resistor plate of each of the resistor modules, and to weld the second rivet, the second electrode plate, and the resistor plate of each of the resistor modules.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
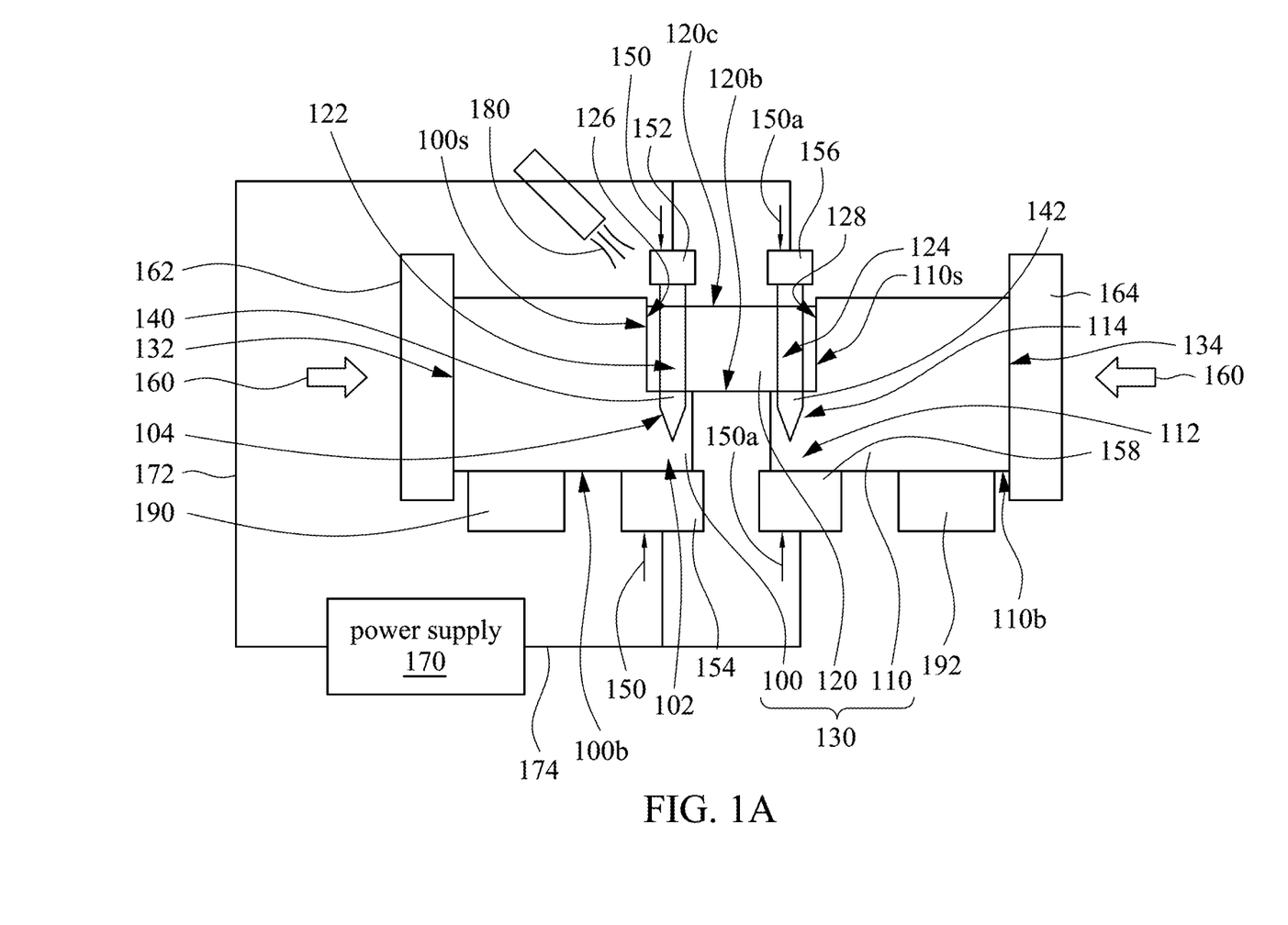
FIG. 1A is a schematic diagram of an installation for manufacturing a shunt resistor in accordance with a first embodiment of the present invention.
Figure 2:
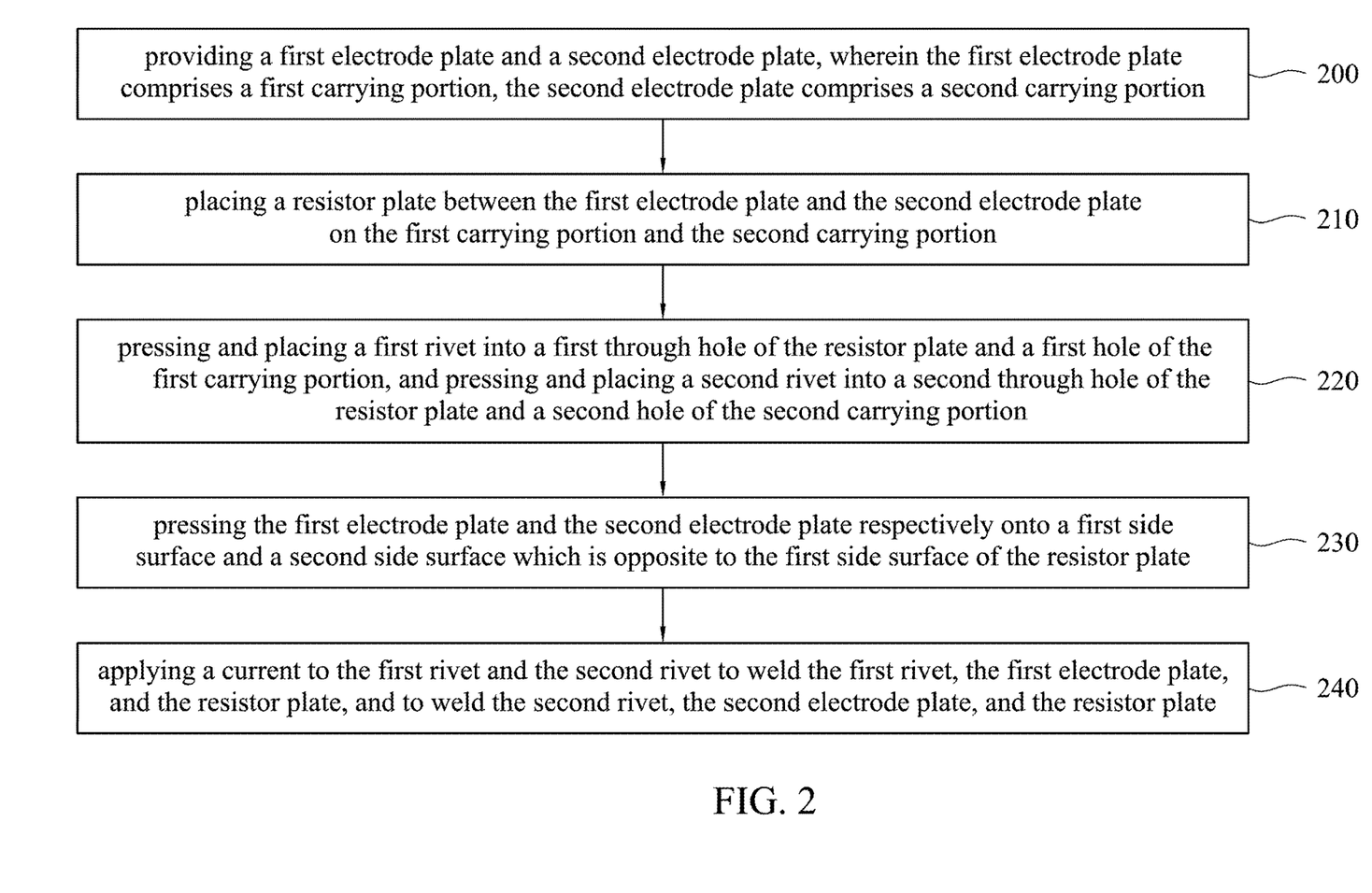
FIG. 2 is a flow chart of a method for manufacturing a shunt resistor in accordance with the first embodiment of this invention.

Referring to FIG. 1A and FIG. 2, FIG. 1A is a schematic diagram of an installation for manufacturing a shunt resistor in accordance with a first embodiment of the present invention, and FIG. 2 is a flow chart of a method for manufacturing a shunt resistor in accordance with the first embodiment of this invention. In the present embodiment, in manufacturing a shunt resistor, a step 200 is firstly performed to provide a first electrode plate 100 and a second electrode plate 110. The first electrode plate 100 includes a first carrying portion 102, in which the first carrying portion 102 protrudes from a side surface 100s of the first electrode plate 100. The second electrode plate 110 includes a second carrying portion 112, in which the second carrying portion 112 protrudes from a side surface 110s of the second electrode plate 110. In the other embodiments, the first electrode plate 100 and the second electrode plate 110 may include stepped structures. The first electrode plate 100 has at least one first hole 104, in which the first hole 104 is caved in the first carrying portion 102. The second electrode plate 110 also has at least one second hole 114, in which the second hole 114 is caved in the second carrying portion 112. The first electrode plate 100 and the second electrode plate 110 may be formed by punching a conductive electrode material, thereby forming electrode plates with desired shapes. Materials of the first electrode plate 100 and the second electrode plate 110 are highly electrically-conductive materials, such as copper (Cu).

Next, a step 210 is performed to provide a resistor plate 120 and to place the resistor plate 120 on the first carrying portion 102 of the first electrode plate 100 and the second carrying portion 112 of the second electrode plate 110, in which the resistor plate is placed between the first electrode plate 100 and the second electrode plate 110. The resistor plate 120, the first electrode plate 100, and the second electrode plate 110 form a resistor module 130 together. The resistor plate 120 has at least one first through hole 122 and at least one second through hole 124, in which the first through hole 122 and the second through hole 124 are respectively located in two opposite sides and both pass through the resistor plate 120. In placing the resistor plate 120, the first through hole 122 of the resistor plate 120 is correspondingly located on the first hole 104 of the first carrying portion 102 of the first electrode plate 100, the second through hole 124 of the resistor plate 120 is correspondingly located on the second hole 114 of the second carrying portion 112 of the second electrode plate 110, and the first through hole 122 and the second through hole 124 are respectively aligned to the first hole 104 and the second hole 114. The resistor plate 120 may be formed by punching a resistance alloy material, so as to form the resistor plate 120 with a desired shape and resistance. A material of the resistor plate 120 includes, but is not limited to, a MnCuSn alloy, a MnCuNi alloy, a MnCu alloy, a NiCrAl alloy, a NiCrAlSi alloy, or a FeCrAl alloy.

Figure 1B:
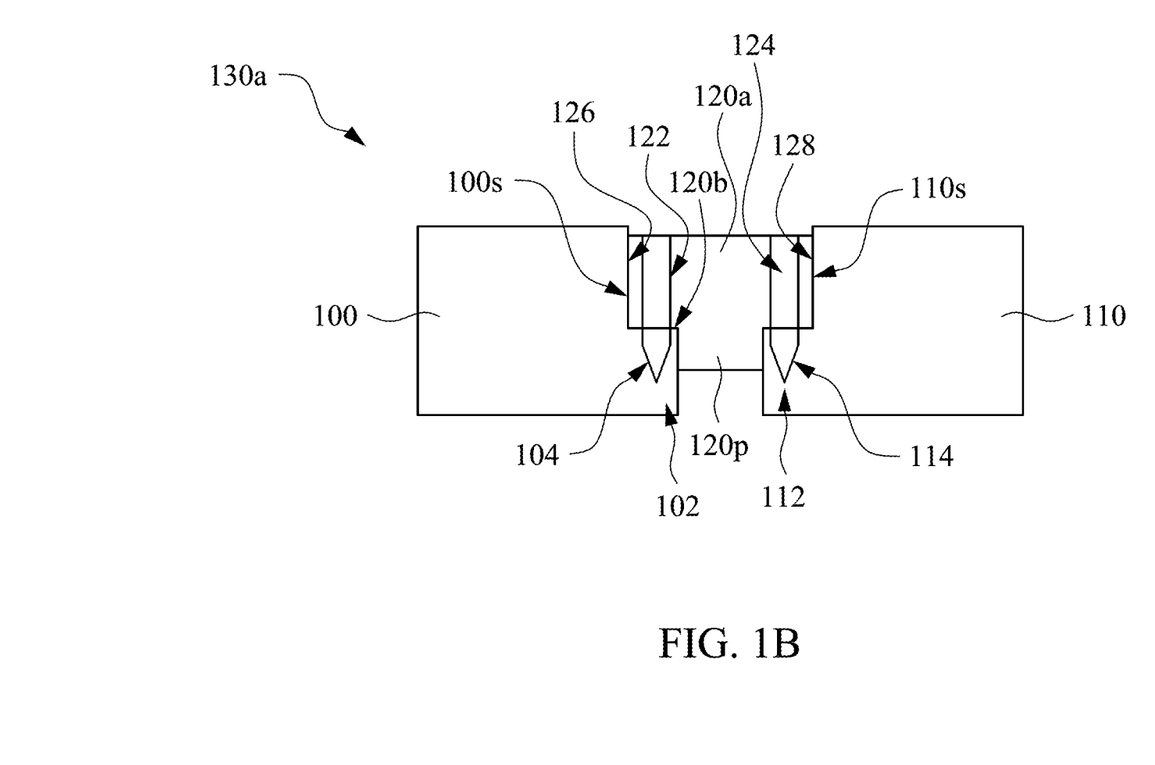
FIG. 1B is a schematic diagram of an installation for manufacturing a shunt resistor in accordance with another embodiment of the present invention.

In the present embodiment, the resistor plate 120 shown in FIG. 1A is a rectangular structure and has a flat bottom surface 120b. In other embodiments, the structure of the resistor plate 120 is not limited to the example shown in FIG. 1A, and may be a cube or structures in other shapes. Referring to FIG. 1B, FIG. 1B is a schematic diagram of an installation for manufacturing a shunt resistor in accordance with another embodiment of the present invention. A structure of a resistor module 130a is substantially similar to the structure of the aforementioned resistor module 130, and a difference between the resistor module 130a and the resistor module 130 is that the resistor plate 120a of the resistor module 130a is a structure in a T-like shape. That is the resistor plate 120a has a protrusion portion 120p protruding from a bottom surface 120b of the resistor plate 120a.

Referring to FIG. 1A and FIG. 2 again, after the resistor plate 120 is placed on the first electrode plate 100 and the second electrode plate 110, a step 220 is performed to insert a first rivet 140 into the corresponding first through hole 122 and the first hole 104, and to insert a second rivet 142 into the corresponding second through hole 124 and the second hole 114. With the first rivet 140 and the second rivet 142, the resistor plate 120 can be pre-positioned on the first electrode plate 100 and the second electrode plate 110. In a preferred embodiment, the first rivet 140 and the second rivet 142 slightly protrude from a top surface 120c of the resistor plate 120. Materials of the first rivet 140 and the second rivet 142 may be the same as materials of the first electrode plate 100 and the second electrode plate 110. In some certain examples, the materials of the first rivet 140 and the second rivet 142 may be different from the materials of the first electrode 100 and the second electrode plate 110.

Next, a pressure 150 is applied to a bottom surface of the first carrying portion 102 of the first electrode plate 100 and the first rivet 140, and a pressure 150a is applied to a bottom surface of the second carrying portion 112 of the second electrode plate 110 and the second rivet 142, so as to closely connect the first rivet 140 with the first electrode plate 100 and the resistor plate 120, and to closely connect the second rivet 142 with the second electrode plate 110 and the resistor plate 120. In some examples, a first conductive element 152 and a second conductive element 154 that are high-temperature resistant may be used to apply the pressure 150 to the first rivet 140 and the bottom surface of the first carrying portion 102 of the first electrode plate 100 respectively, and a third conductive element 156 and a fourth conductive element 158 that are high-temperature resistant may be used to apply the pressure 150a to the second rivet 142 and the bottom surface of the second carrying portion 112 of the second electrode plate 110 respectively. In other embodiments, the first conductive element 152 and the third conductive element 156 may be integrated into one conductive element to simultaneously apply the pressure to the first rivet 140 and the second rivet 142; and the second conductive element 154 and the fourth conductive element 158 may also be integrated into one conductive element to simultaneously apply the pressure to the bottom surface of the first carrying portion 102 of the first electrode plate 100 and the bottom surface of the second carrying portion 112 of the second electrode plate 110. Materials of the first conductive element 152, the second conductive element 154, the third conductive element 156, and the fourth conductive element 158 of high-temperature resistant preferably use conductive materials with melting points exceeding 3000 degrees Celsius, such as carbon plates or tungsten plates.

In some examples, a step 230 may be optionally performed to apply a pressure 160 to the first electrode plate 100 and the second electrode plate 110, thereby respectively pressing the first electrode plate 100 and the second electrode plate 110 onto the first side surface 126 and the second side surface 128 of the resistor plate 120 from a first side end 132 and a second side end 134 of the resistor module 130, in which the first side end 132 is opposite to the second side end 134. The step 230 may be performed before the step 220. For example, the pressure 160 may preferably range from about 0.1 MPa to about 10 MPa depending on a current applied to the resistor module 130. With the pressing step, the side surface 100s of the first electrode plate 100 is closely adhered to the first side surface 126 of the resistor plate 120, and the side surface 110s of the second electrode plate 110 is closely adhered to the second side surface 128 of the resistor plate 120. A connection surface formed between the first electrode plate 100 and the resistor plate 120, and a connection surface formed between the second electrode plate 110 and the resistor plate 120 both are hetero-junctions. In some examples, a first pressing element 162 and a second pressing element 164 may be used to press the first electrode plate 100 and the second electrode plate 110 respectively, in which the first pressing element 162 and the second pressing element 164 are high-temperature resistant. Materials of the first pressing element 162 and the second pressing element 164 may use high-temperature resistant materials, such as carbon plates or tungsten plates.

Subsequently, a step 240 is performed to apply a current to the first rivet 140 through the first electrode plate 100 and the first rivet 140, and to apply a current to the second rivet 142 through the second electrode plate 110 and the second rivet 142 by using a power supply 170. The power supply 170 may be a direct current (DC) power supply or an alternating current (AC) power supply. In some examples, the power supply 170 may apply the current through the first conductive element 152, the second conductive element 154, the third conductive element 156, and the fourth conductive element 158 that are high-temperature resistant. The first conductive element 152 presses the first rivet 140, the second conductive element 154 presses the bottom surface of the first carrying portion 102 of the first electrode plate 100, the third conductive element 156 presses the second rivet 142, and the fourth conductive element 158 presses the bottom surface of the second carrying portion 112 of the second electrode plate 110. The power supply 170 preferably applies high current to the first rivet 140 and the second rivet 142. For example, the current applied by the power supply 170 may range from about 700 A to about 800 A, or higher. In some examples, two electrodes of the power supply 170 are connected to the first conductive element 152 and the third conductive element 156, and the second conductive element 154 and the fourth conductive element 158 respectively via a first wire 172 and a second wire 174. The power supply 170 applies the current to the first rivet 140 and the second rivet 142 from the first rivet 140, the second rivet 142, the first electrode plate 100, and the second electrode plate 110 through the first wire 172 and the second wire 174.

The current is mainly centered on the first rivet 140 and the second rivet 142, and the heat generated by applying the current is also centered on the first rivet 140 and the second rivet 142, such that an outer edge of the first rivet 140, and edges of the first electrode plate 100 and the resistor plate 120 that are close to the first rivet 140 are heated and melt firstly; and an outer edge of the second rivet 142, and edges of the second electrode plate 110 and the resistor plate 120 that are close to the second rivet 142 are heated and melt firstly. With the pressures 150, 150a, and 160, materials of the first rivet 140, the first electrode plate 100, and the resistor plate 120 diffuse and exchange with each other by thermal melt, and materials of the second rivet 142, and the second electrode plate 110, and the resistor plate 120 diffuse and exchange with each other by thermal melt, thus welding together to form a shunt resistor. Accordingly, the first rivet 140 and the second rivet 142 can combine the resistor plate 120 with the first electrode plate 100 and the second electrode plate 110.

In some examples, when the current is applied to the first rivet 140 and the second rivet 142, an inert gas 180, such as nitrogen or argon, may be simultaneously introduced, such that the welding of the resistor module 130 is performed in an inert gas environment to protect the welded portions from being oxidized. In addition, when the current is applied to the first rivet 140 and the second rivet 142, the first electrode plate 100 may be placed on a first heat conductive base 190, and the second electrode plate 110 may be placed on a second heat conductive base 192. In some exemplary examples, the first heat conductive base 190 is closer to the first pressing element 162 and is farther away the first rivet 140, such that the heat of the first electrode plate 100 is conducted by the first heat conductive base 190, thereby centering the heat on the first rivet 140. In addition, the second heat conductive base 192 is closer to the second pressing element 164 and is farther away the second rivet 142, such that the heat of the second electrode plate 110 is conducted by the second heat conductive base 192, thereby centering the heat on the second rivet 142.

In this method, the electrode material and the resistance alloy material are respectively used to form the first electrode plate 100 and the second electrode plate 110, and the resistor plate 120, and then the first rivet 140 is used to combine the first electrode plate 100 with the resistor plate 120 located on the first carrying portion 102 of the first electrode plate 100, and the second rivet 142 is used to combine the second electrode plate 110 with the resistor plate 120 located on the second carrying portion 112 of the second electrode plate 110. Thus, utilization of the electrode material and the resistance material is increased, remnants of the electrode material and the resistance material are easy to be recycled, and the shunt resistors may be in various shapes according to the practical requirements. In addition, the first rivet 140 and the second rivet 142 can pre-position the resistor plate 120 on the first electrode plate 100 and the second electrode plate 110, and a rate of welding the first rivet 140, the first electrode plate 100, and the resistor plate 120 and a rate of welding the second rivet 142, the second electrode plate 110, and the resistor plate 120 are increased by directly applying the pressures 150 and 160 and the current to the first rivet 140, and directly applying the pressures 150a and 160 and the current to the second rivet 142. Accordingly, with the application of the method, productivity is effectively enhanced, and energy consumption of welding the resistor module 130 is greatly decreased, thereby reducing production cost of the shunt resistor. Furthermore, a combination method that uses the first rivet 140 to weld the first electrode plate 100 and the resistor plate 120, and uses the second rivet 142 to weld the second electrode plate 110 and the resistor plate 120 can strengthen the structure of the shunt resistor, thus enhancing stability of the shunt resistor. Moreover, the resistance of the resistor plate 120 can be firstly and accurately calculated in forming the resistor plate 120, such that the accuracy of the resistance of the shunt resistor is enhanced, and time for trimming the resistance of the shunt resistor is greatly reduced, thereby effectively increasing productivity.

Figure 3:
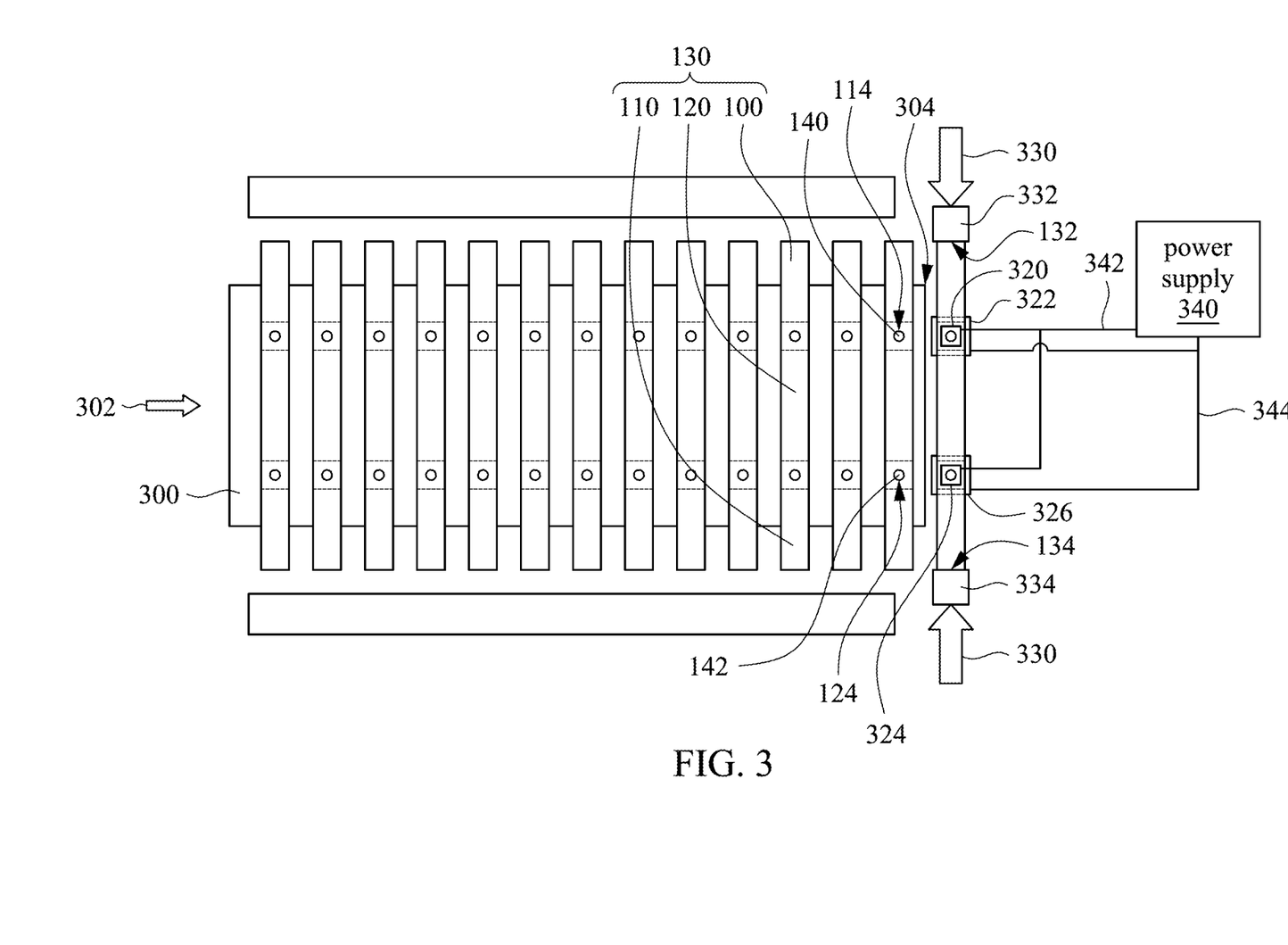
FIG. 3 is a schematic diagram of an installation for manufacturing a shunt resistor in accordance with a second embodiment of the present invention.
Figure 4:
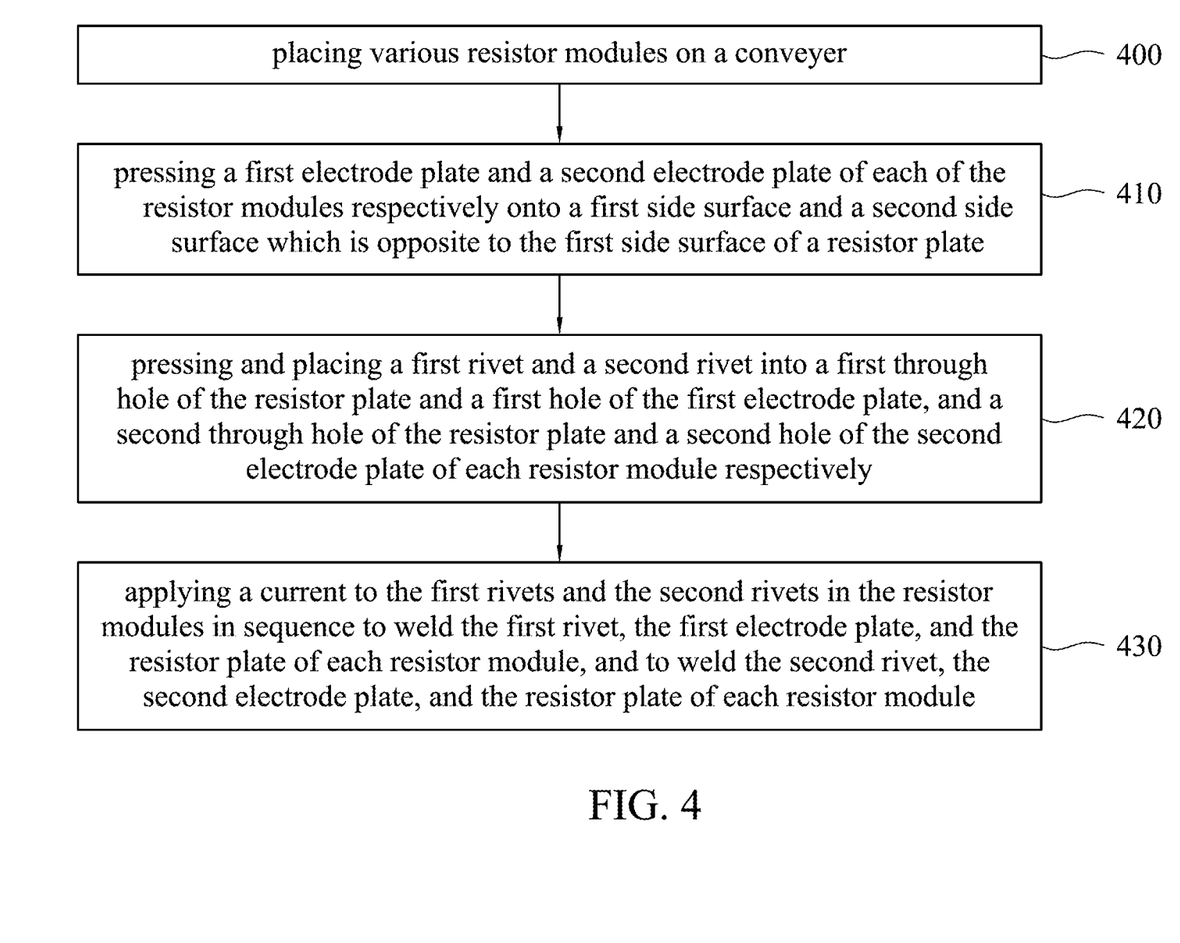
FIG. 4 is a flow chart of a method for manufacturing a shunt resistor in accordance with the second embodiment of this invention.

Referring to FIG. 3 and FIG. 4, FIG. 3 is a schematic diagram of an installation for manufacturing a shunt resistor in accordance with a second embodiment of the present invention, and FIG. 4 is a flow chart of a method for manufacturing a shunt resistor in accordance with the second embodiment of this invention. In the present embodiment, in manufacturing a shunt resistor, a step 400 is firstly performed to provide various resistor modules 130 as shown in FIG. 1, and to arrange the resistor modules 130 on a conveyer 300 in sequence. The conveyer 300 can convey the resistor modules 130 forward along a direction 302. The resistor modules 130 are transversely arranged on the conveyer 300, and the first electrode plate 100 and the second electrode plate 110 of each of the resistor modules 130 may respectively protrude two opposite sides of the conveyer 300. For example, the conveyer 300 may be a conveyer belt. The structures of the resistor modules 130 are described in the aforementioned embodiment, and repeat no more here.

Next, a step 410 is performed to apply a pressure 330 to the first electrode plate 100 and the second electrode plate 110, thereby pressing the first electrode plate 100 onto the first side surface 126 of the resistor plate 120 from the first side end 132 of the resistor module 130, and pressing the second electrode plate 110 onto the second side surface 128 of the resistor plate 120 from the second side end 134 of the resistor module 130. Thus, the side surface 100s of the first electrode plate 100 is closely adhered to the first side surface 126 of the resistor plate 120, and the side surface 110s of the second electrode plate 110 is closely adhered to the second side surface 128 of the resistor plate 120. For example, the pressure 330 preferably ranges from about 0.1 MPa to about 10 MPa depending on a current applied to the resistor module 130. A connection surface formed between the first electrode plate 100 and the resistor plate 120, and a connection surface formed between the second electrode plate 110 and the resistor plate 120 both are hetero-junctions. In some examples, a first pressing element 332 and a second pressing element 334 may be used to press the first electrode plate 100 and the second electrode plate 110 respectively, in which the first pressing element 332 and the second pressing element 334 are high-temperature resistant. Materials of the first pressing element 332 and the second pressing element 334 may use high-temperature resistant materials, such as carbon plates or tungsten plates.

Next, referring to FIG. 1A simultaneously, a step 420 is performed to insert the first rivet 140 into the first through hole 122 of the resistor plate 120 and the first hole 104 of the first electrode plate 100 of each of the resistor modules 130, and to insert the second rivet 142 into the second through hole 124 of the resistor plate 120 and the second hole 114 of the second electrode plate 110 of each of the resistor modules 130. Thus, the resistor plate 120 can be pre-positioned on the first electrode plate 100 and the second electrode plate 110 by the first rivet 140 and the second rivet 142. In some examples, the first rivet 140 may be firstly inserted into the corresponding first through hole 122 and the first hole 104, and the second rivet 142 may be inserted into the corresponding second through hole 124 and the second hole 114 to pre-combine the resistor plate 120 with the first electrode plate 100 and the second electrode plate 110. Then, the step 410 is performed to press the first electrode plate 100 onto the first side surface 126 of the resistor plate 120, and to press the second electrode plate 110 onto the second side surface 128 of the resistor plate 120. In some exemplary examples, the first rivet 140 and the second rivet 142 slightly protrude from the top surface 120c of the resistor plate 120.

Then, the pressure 150 is sequentially applied to the bottom surfaces 100b of the first electrode plates 100 and the first rivets 140 in the resistor modules 130, and the pressure 150a is sequentially applied to the bottom surfaces 110b of the second electrode plates 110 and the second rivets 142 in the resistor modules 130 at an outlet 304 of the conveyer 300, thereby more closely connecting the first rivets 140 with the first electrode plates 100 and the resistor plates 120, and more closely connecting the second rivets 142 with the second electrode plates 110 and the resistor plates 120. In some examples, a first conductive element 320 and a second conductive element 322 that are high-temperature resistant may be used to apply the pressure to the first rivet 140 and the bottom surface of the first carrying portion 102 of the first electrode plate 100 respectively, and a third conductive element 324 and a fourth conductive element 326 that are high-temperature resistant may be used to apply the pressure to the second rivet 142 and the bottom surface of the second carrying portion 112 of the second electrode plate 110 respectively. Materials of the first conductive element 320, the second conductive element 322, the third conductive element 324, and the fourth conductive element 326 of high-temperature resistant may use conductive materials with melting points exceeding 3000 degrees Celsius, such as carbon plates or tungsten plates.

Subsequently, a step 430 is performed to apply a current to the first rivet 140 and the second rivet 142 respectively through the first electrode plate 100 of the resistor module 130 and the first rivet 140, and through the second electrode plate 110 and the second rivet 142 by using a power supply 340. The power supply 340 may be a direct current power supply or an alternating current power supply. In some examples, the power supply 340 may apply the current through the first conductive element 320, the second conductive element 322, the third conductive element 324, and the fourth conductive element 326 that are high-temperature resistant, in which the first conductive element 320, the second conductive element 322, the third conductive element 324, and the fourth conductive element 326 are near the outlet 304 of the conveyer 300. The first conductive element 320 and the third conductive element 324 respectively press the first rivet 140 on the first electrode plate 100 and the second rivet 142 on the second electrode plate 110, and the second conductive element 322 and the fourth conductive element 326 respectively press the bottom surface of the first carrying portion 102 of the first electrode plate 100 and the bottom surface of the second carrying portion 112 of the second electrode plate 110. The power supply 340 preferably applies to the first rivet 140 and the second rivet 142 with high current, such as the current ranging from about 700 A to about 800 A, or higher. In some examples, two electrodes of the power supply 340 are connected to the first conductive element 320 and the third conductive element 324, and the second conductive element 322 and the fourth conductive element 326 respectively via a first wire 342 and a second wire 344. The power supply 340 applies the current to the first rivet 140 and the second rivet 142 from the first electrode plate 100, the second electrode plate 110, the first rivet 140, and the second rivet 142 through the first wire 342 and the second wire 344.

With the applying of the current and the pressures, an outer edge of the first rivet 140, and edges of the first electrode plate 100 and the resistor plate 120 that are close to the first rivet 140 are heated and melt firstly, and an outer edge of the second rivet 142, and edges of the second electrode plate 110 and the resistor plate 120 that are close to the second rivet 142 are heated and melt firstly. Thus, materials of the first rivet 140, the first electrode plate 100, and the resistor plate 120 diffuse and exchange with each other by thermal melt, and materials of the second rivet 142, and the second electrode plate 110, and the resistor plate 120 diffuse and exchange with each other by thermal melt, thereby welding together. Therefore, the first rivet 140 and the second rivet 142 can combine the resistor plate 120 with the first carrying portion 102 of the first electrode plate 100 and the second carrying portion 112 of the second electrode plate 110. In some exemplary examples, the operation of applying the current to the first rivet 140 and the second rivet 142 is performed in an inert gas environment to protect the welded portions from being oxidized, in which the inert gas may be nitrogen or argon. In the present embodiment, the resistor modules 130, and the first rivets 140 and the second rivet 142 on the resistor modules 130 at the outlet 304 of the conveyer 300 are sequentially applied with the pressure and the current as the conveying of the conveyer 300, thereby sequentially welding the resistor modules to form shunt resistors. Accordingly, the application of the method can greatly enhance production efficiency of the shunt resistors.

Although the present invention has been described in considerable detail with reference to certain embodiments thereof, the foregoing embodiments of the present invention are illustrative of the present invention rather than limiting of the present invention. It will be apparent to those having ordinary skill in the art that various modifications and variations can be made to the present invention without departing from the scope or spirit of the invention. Therefore, the spirit and scope of the appended claims should not be limited to the description of the embodiments contained herein.

What is claimed is:

1. A method for manufacturing a shunt resistor, the method comprising:

providing a first electrode plate and a second electrode plate, wherein the first electrode plate comprises a first carrying portion, the second electrode plate comprises a second carrying portion, the first carrying portion has at least one first hole, and the second carrying portion has at least one second hole;

placing a resistor plate between the first electrode plate and the second electrode plate on the first carrying portion and the second carrying portion, wherein the resistor plate has at least one first through hole and at least one second through hole, the at least one first through hole is correspondingly located on the at least one first hole, and the at least one second through hole is correspondingly located on the at least one second hole;

pressing and placing at least one first rivet into the at least one first through hole and the at least one first hole correspondingly, and pressing and placing at least one second rivet into the at least one second through hole and the at least one second hole correspondingly; and applying a current to the at least one first rivet and the at least one second rivet to weld the at least one first rivet, the first electrode plate, and the resistor plate, and to weld the at least one second rivet, the second electrode plate, and the resistor plate.

2. The method of claim 1, wherein the resistor plate has a first side surface and a second side surface opposite to the first side surface, and before applying the current to the first at least one rivet and the at least one second rivet to weld the at least one first rivet, the method further comprises pressing the first electrode plate onto the first side surface of the resistor plate, and pressing the second electrode plate onto the second side surface of the resistor plate.

3. The method of claim 1, wherein applying the current to the at least one first rivet and the at least one second rivet further comprises using a first conductive element and a second conductive element to respectively press the at least one first rivet and a bottom surface of the first carrying portion, and using a third conductive element and a fourth conductive element to respectively press the at least one second rivet and a bottom surface of the second carrying portion.

4. The method of claim 1, wherein applying the current to the at least one first rivet and the at least one second rivet further comprises using a conductive element to press the at least one first rivet and the at least one second rivet simultaneously, and using another conductive element to press a bottom surface of the first carrying portion and a bottom surface of the second carrying portion simultaneously.

5. The method of claim 1, wherein during applying the current to the at least one first rivet and the at least one second rivet, the method further comprises placing the first electrode plate on a first heat conductive base, and placing the second electrode plate on a second heat conductive base.

6. A method for manufacturing a shunt resistor, the method comprising:

placing a plurality of resistor modules on a conveyer, wherein each of the resistor modules comprises:

a first electrode plate, wherein the first electrode plate comprises a first carrying portion, and the first carrying portion has at least one first hole;

a second electrode plate, wherein the second electrode plate comprises a second carrying portion, and the second carrying portion has at least one second hole; and a resistor plate disposed between the first electrode plate and the second electrode plate and located on the first carrying portion and the second carrying portion, wherein the resistor plate has a first side surface and a second side surface opposite to the first side surface, the resistor plate has at least one first through hole and at least one second through hole, the at least one first through hole is correspondingly located on the at least one first hole, and the at least one second through hole is correspondingly located on the at least one second hole;

pressing the first electrode plate and the second electrode plate of each of the resistor modules onto the first side surface and the second side surface of the resistor plate respectively;

pressing and placing at least one first rivet into the at least one first through hole and the at least one first hole of each of the resistor modules correspondingly, and pressing and placing at least one second rivet into the at least one second through hole and the at least one second hole of each of the resistor modules correspondingly; and applying a current to the first rivets and the second rivets in the resistor modules in sequence to weld the at least one first rivet, the first electrode plate, and the resistor plate of each of the resistor modules, and to weld the at least one second rivet, the second electrode plate, and the resistor plate of each of the resistor modules.

7. The method of claim 6, wherein pressing the first electrode plate and the second electrode plate of each of the resistor modules onto the first side surface and the second side surface of the resistor plate respectively comprises using a first pressing element to press the first electrode plate, and using a second pressing element to press the second plate.

8. The method of claim 6, wherein applying the current to the at least one first rivet and the at least one second rivet of each of the resistor modules comprises using a first conductive element and a second conductive element to respectively press the at least one first rivet and a bottom surface of the first carrying portion, and using a third conductive element and a fourth conductive element to respectively press the at least one second rivet and a bottom surface of the second carrying portion.

9. The method of claim 6, wherein applying the current to the at least one first rivet and the at least one second rivet of each of the resistor modules comprises using a conductive element to simultaneously press the at least one first rivet and the at least one second rivet, and using another conductive element to simultaneously press a bottom surface of the first carrying portion and a bottom surface of the second carrying portion.

10. The method of claim 6, wherein applying the current is performed in an inert gas environment.

* * * * *